(Model.)
J. G. GILLELAND & J. ZIEGELE.
MOLE TRAP.
No. 280,811. Patented July 10, 1883.
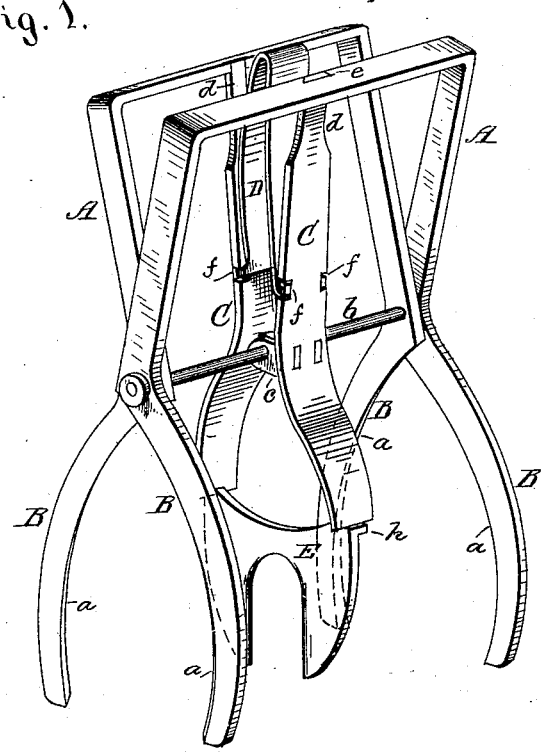
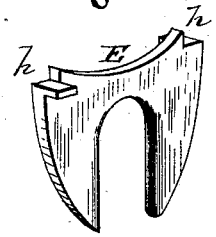
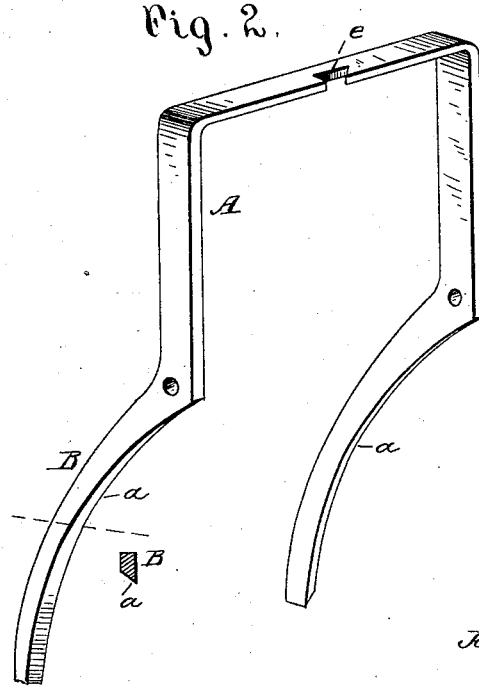
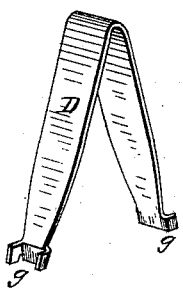
WITNESSES
F. L. Durand.
N. E. Oliphant
INVENTORS
James G. Gilleland,
John Ziegele,
per Chas. H. Foster,
Attorney

UNITED STATES PATENT OFFICE.

JAMES G. GILLELAND AND JOHN ZIEGELE, OF PALMYRA, MICHIGAN.

MOLE-TRAP.

SPECIFICATION forming part of Letters Patent No. 280,811, dated July 10, 1883.

Application filed April 24, 1883. (Model.)

*To all whom it may concern:*

Be it known that we, JAMES G. GILLELAND and JOHN ZIEGELE, citizens of the United States, residing at Palmyra, in the county of Lenawee and State of Michigan, have invented certain new and useful Improvements in Mole-Traps; and we do declare that the following is a full, clear, and exact description of the same, reference being had to the annexed drawings, making a part of this specification, and to the letters and figures of reference marked thereon.

Figure 1 of the drawings is a perspective view of our improved mole-trap, showing it in a set position; Fig. 2, a similar view, in detail, of one of the pivoted frames with its jaws; Fig. 3, a detail view, in perspective, of the flanged plate for holding the jaws apart; and Fig. 4, a similar view of the spring.

The present invention has relation to certain new and useful improvements in that class of mole-traps consisting of forked or bifurcated jaws having handles or levers extending up from the same and pivoted together near their lower ends, the jaws being held apart, when the trap is set, by a dog or shouldered plate, and sprung, when the dog or plate is dislodged, by a spring held between the handles or levers.

The object of the invention is to improve the construction of the above-mentioned class of traps, whereby a greater certainty of action of the jaws is obtained when the trap is sprung; also, to render it much stronger and less liability of its becoming inoperative, more readily set, and sensitive to the action of the mole. These objects we attain by the construction, substantially as shown in the drawings, and hereinafter described and claimed.

In the accompanying drawings, A represents two metal frames, that portion forming the sides terminating in outwardly-curved jaws B, each of which has a knife-edge, *a*. The frames A are pivotally connected together by a horizontal rod, *b*, passing through the frames, and also through ears *c*, extending from the inner side of curved levers C, by which means said levers are also pivotally connected to the rod. The upper ends of the levers C have dovetailed shanks *d*, which fit in dovetail slots *e* in the horizontal or upper part of the frames A, said levers, above their pivotal connection, having notches *f*, which fit the yokes *g* upon the lower ends of a curved spring, D.

Instead of having the usual handles extending up from the forked jaws, as hereinbefore referred to, each pair of jaws extends up and terminates in a frame, A, thus rendering the trap much stronger and steadier when it is being sprung, with an increased leverage power, while at the same time the jaws and frame can be cheaply made from a single piece of metal.

The levers C, by connecting them to the frames A by dovetail and groove, not only provide a simple means of firmly securing the upper ends of the levers or shanks thereof to the frame, but admit of their being readily detached after the rod *b* has been removed.

A further advantage of the invention is in the employment of the levers C, which give increased power to the jaws when the trap is sprung, and the rod, extending the entire width of the trap, forms a brace for the frames and jaws.

Heretofore the spring in this class of traps was connected directly to and between the handles; but by the employment of the levers and locating the spring between them, as shown in Fig. 1, the trap is much more effective in its operation, as the force of the spring is more equally distributed.

The lower ends of the levers C are curved in an outward direction, as shown, and the trap is set by the employment of the ordinary dog or arched plate, E, the lower ends of the levers resting on the shoulders *h* thereof, which hold the jaws open or apart, as shown in Fig. 1. When the trap is thus set, the jaws B are located upon each side of the runway or path of the mole, and the arched plate E directly across it, and as the mole passes in between the jaws in either direction and against the plate the latter will be dislodged, and the levers C, with the spring B, will cause the jaws to be quickly sprung, the shear or cutting edges *a* being brought against the animal.

Having now fully described our invention, what we claim as new, and desire to secure by Letters Patent, is—

1. In an animal-trap, the pivoted frames A, having jaws B, in combination with the independently-pivoted levers C, the spring D, and plate E, substantially as and for the purpose set forth.

2. The frames A, having jaws B, and pivotally connected together by the rod $b$, in combination with the curved levers pivotally connected to said rod and having notches $f$, and the spring D, having yokes $g$, and plate E, substantially as and for the purpose described.

In testimony that we claim the above we have hereunto subscribed our names in the presence of two witnesses.

JAMES G. GILLELAND.
JOHN ZIEGELE.

Witnesses:
WILLIAM S. LINN,
CORNELIUS VAN WEY.